United States Patent
Shih et al.

(10) Patent No.: US 7,002,654 B2
(45) Date of Patent: Feb. 21, 2006

(54) PIXEL STRUCTURE OF IN-PLANE SWITCHING LIQUID CRYSTAL DISPLAY DEVICE

(75) Inventors: Po-Sheng Shih, Hsinchu (TW); Wei-Hsin Wang, Hsinchu (TW)

(73) Assignee: Hannstar Display Corporation, (TW)

( * ) Notice: Subject to any disclaimer, the term of this patent is extended or adjusted under 35 U.S.C. 154(b) by 29 days.

(21) Appl. No.: 10/655,138

(22) Filed: Sep. 4, 2003

(65) Prior Publication Data
US 2004/0169808 A1   Sep. 2, 2004

(30) Foreign Application Priority Data
Feb. 27, 2003 (TW) .............................. 92104329 A

(51) Int. Cl.
*G02F 1/1343* (2006.01)
(52) U.S. Cl. ..................... 349/141; 349/143; 349/38; 349/39
(58) Field of Classification Search ................ 349/141, 349/143, 38, 39
See application file for complete search history.

(56) References Cited

U.S. PATENT DOCUMENTS

| | | | | |
|---|---|---|---|---|
| 6,069,678 | A | * | 5/2000 | Sakamoto et al. ........... 349/141 |
| 6,091,473 | A | * | 7/2000 | Hebiguchi ................... 349/141 |
| 6,341,003 | B1 | * | 1/2002 | Ashizawa et al. ........... 349/141 |
| 6,433,842 | B1 | * | 8/2002 | Kaneko et al. ................ 349/43 |
| 6,461,485 | B1 | * | 10/2002 | Mizouchi et al. ....... 204/192.15 |

* cited by examiner

*Primary Examiner*—Andrew Schechter
*Assistant Examiner*—Mike Qi
(74) *Attorney, Agent, or Firm*—The Webb Law Firm

(57) ABSTRACT

A pixel structure of an in-plane switching liquid crystal display device is described. The structure includes a glass substrate, a data line, a gate line, a transistor and a common electrode. The data line, the gate line and the transistor are located on the glass substrate. The transistor is composed of a gate electrode, a source electrode and a drain electrode. The common electrode has an opening disposed directly over the data line, the gate line and the transistor, wherein the opening is wider than the data line.

21 Claims, 9 Drawing Sheets

PIXEL STRUCTURE OF IN-PLANE SWITCHING LIQUID CRYSTAL DISPLAY DEVICE

BACKGROUND OF THE INVENTION

1. Field of Invention

The present invention relates to a pixel structure of a liquid crystal display device. More particularly, the present invention relates to a pixel structure of an in-plane switching liquid crystal display device.

2. Description of Related Art

Liquid crystal display (LCD) has so many advantages, including high picture quality, small volume, light weight, low driving voltage and low power consumption, that LCDs are widely applied in electronic products such as medium or small-sized portable televisions, mobile phones, videos, notebooks, monitors for desktop computers and projection-type televisions. Therefore, as time goes by, LCDs gradually replace present cathode ray tube (CRT) monitors.

To compete with CRT monitors, LCDs are developed in the trend of wide viewing angle and high speed of response. For example, the developed in-plane switching (IPS) liquid crystal display device just provides the advantage of wide viewing angle. In an IPS liquid crystal display device, the common electrode is disposed over the gate line and the data line to provide larger aperture ratio of the device, thereby increasing the brightness of the device.

Reference is made to FIG. 1, which is a top view of a pixel structure of a conventional in-plane switching liquid crystal display device. A gate line 11 is adapted for providing a voltage to a gate electrode 151 of a transistor 15, and a data line 12 is adapted for providing a voltage to a source electrode 152 of a transistor 15. A drain electrode 153 is electrically connected to a pixel electrode 13 and a capacitor 16. The capacitor 16 is adapted to keep the electrical charges. The electrical field generated between the pixel electrode 13 and the common electrode 14 induces the liquid crystal molecules filled in the IPS liquid crystal display device to rotate and therefore an image is displayed on the device.

Reference is made to FIG. 2A, which is a schematic, cross-sectional view taken along 2A—2A of FIG. 1. The data line 12 is disposed over the glass substrate 10. The common electrode 14 is disposed over the data line 12. An organic layer 18 formed over the dielectric layer 17 is used to increase a distance between the data line 12 and the common electrode 14, thereby decreasing the generated coupling capacitance between the data line 12 and the common electrode 14. Reference is also made to FIG. 3, which is a schematic, cross-sectional view taken along 3—3 of FIG. 1. The gate line 11 is disposed over the glass substrate 10. The common electrode 14 is disposed over the gate line 11. An organic layer 18 formed over the dielectric layer 17 is used to increase a distance between the gate line 11 and the common electrode 14, thereby decreasing the generated coupling capacitance between the gate line 11 and the common electrode 14. Generally, the organic layer is made of photocured acrylic type material. In the conventional IPS liquid crystal display device as shown in FIG. 2A and FIG. 3, the common electrode 14 is formed over the gate line 11 and the data line 12 for providing larger aperture ratio of the device. However, the generated coupling ratio between the data line 12 and the common electrode 14 seriously influences the rotation of the liquid crystal molecules in the display region. Please refer to FIG. 2B. The density of the electric field lines 19 between the data line 12 and the common electrode 14, particularly in the region 20, is high. Hence, if the generated coupling capacitance between the region 20 and the data line 12 could be prevented, the generated coupling capacitance between the data line 12 and the common electrode 14 can be significantly lowered. Likewise, in FIG. 3, the density of the electric field lines between the gate line 11 and the common electrode 14, particularly in the region 30, is high. Hence, if the generated coupling capacitance between the region 30 and the gate line 11 could be prevented, the generated coupling capacitance between the gate line 11 and the common electrode 14 can be significantly lowered.

Although U.S. Pat. No. 6,069,678 has provided a solution for an IPS liquid crystal display device manufactured from a top gate transistor. No solution is provided for an IPS liquid crystal display device manufactured from a bottom gate transistor. The IPS liquid crystal display device manufactured from a top gate transistor can merely lower the generated coupling capacitance between the common electrode and the data line, where the generated coupling capacitance between the common electrode and the gate line can not be lowered.

SUMMARY OF THE INVENTION

For the forgoing reasons, it is therefore an objective of the present invention to provide a pixel structure of an in-plane switching liquid crystal display device.

In one aspect, the present invention provides a pixel structure of an in-plane switching liquid crystal display device. The pixel structure comprises a glass substrate, a data line and a common electrode. The data line is disposed over the glass substrate. The common electrode is disposed over the data line. The common electrode has an opening located directly over the data line, wherein the opening is wider than the data line.

In another aspect, the present invention provides a pixel structure of an in-plane switching liquid crystal display device. The pixel structure comprises a glass substrate, a gate line and a common electrode. The gate line is disposed over the glass substrate. The common electrode is disposed over the gate line. The common electrode has an opening located directly over said gate line.

In still another aspect, the present invention provides a pixel structure of an in-plane switching liquid crystal display device. The pixel structure comprises a glass substrate, a transistor and a common electrode. The transistor, consisting essentially of a gate electrode, a source electrode and a drain electrode, is disposed over the glass substrate. The common electrode is disposed over the transistor. The common electrode has an opening located directly over the transistor.

According to the present invention, an opening is formed in the common electrode directly over the data line, the gate line and the transistor, wherein the opening is wider than the data line. Therefore, the generated coupling capacitance between the common electrode and the data line, the gate line and the transistor can be lowered.

It is to be understood that both the foregoing general description and the following detailed description are examples only, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
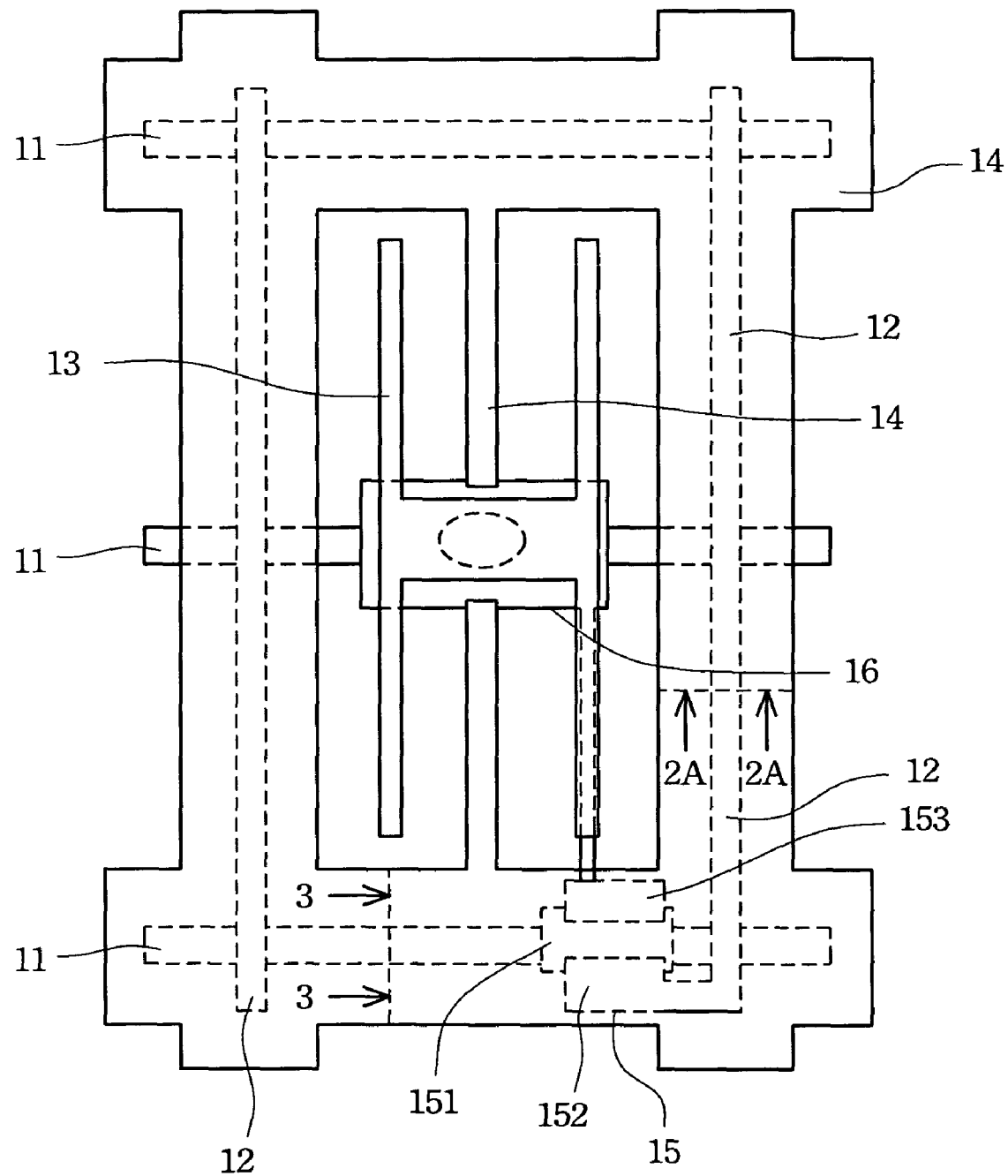
FIG. 1 is a top view of a pixel structure of a conventional in-plane switching liquid crystal display device.
Figure 2A:
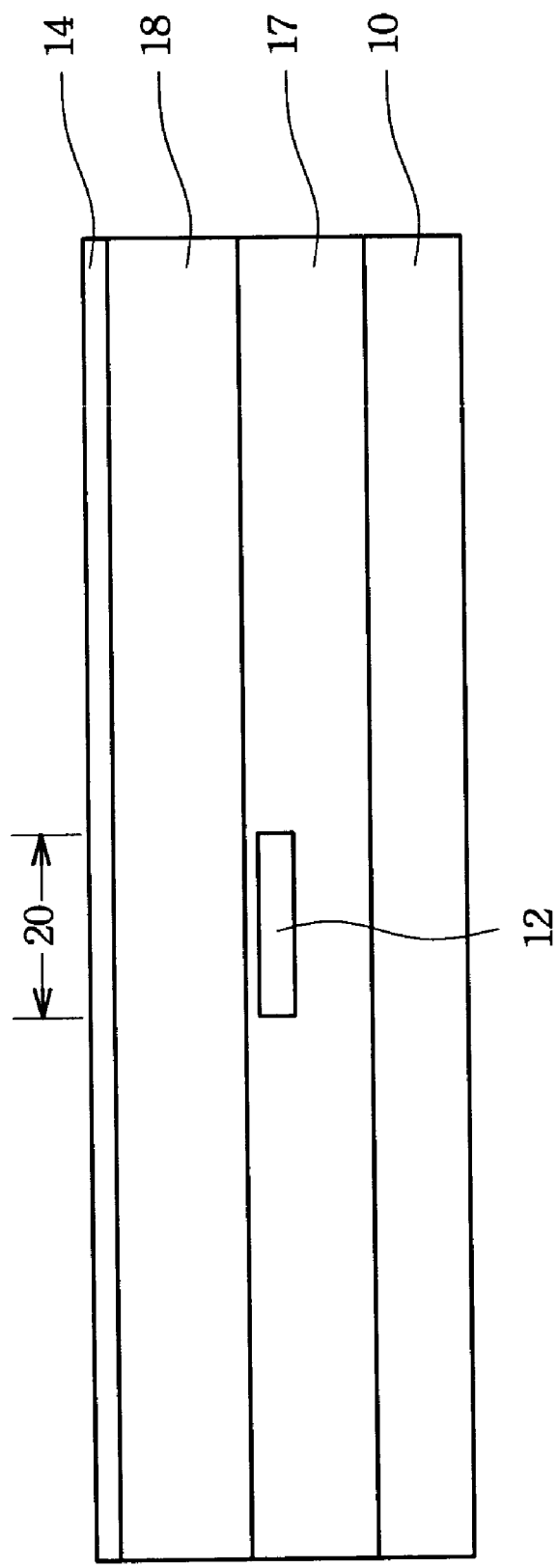
FIG. 2A is a schematic, cross-sectional view taken along 2A—2A of FIG. 1.
Figure 2B:
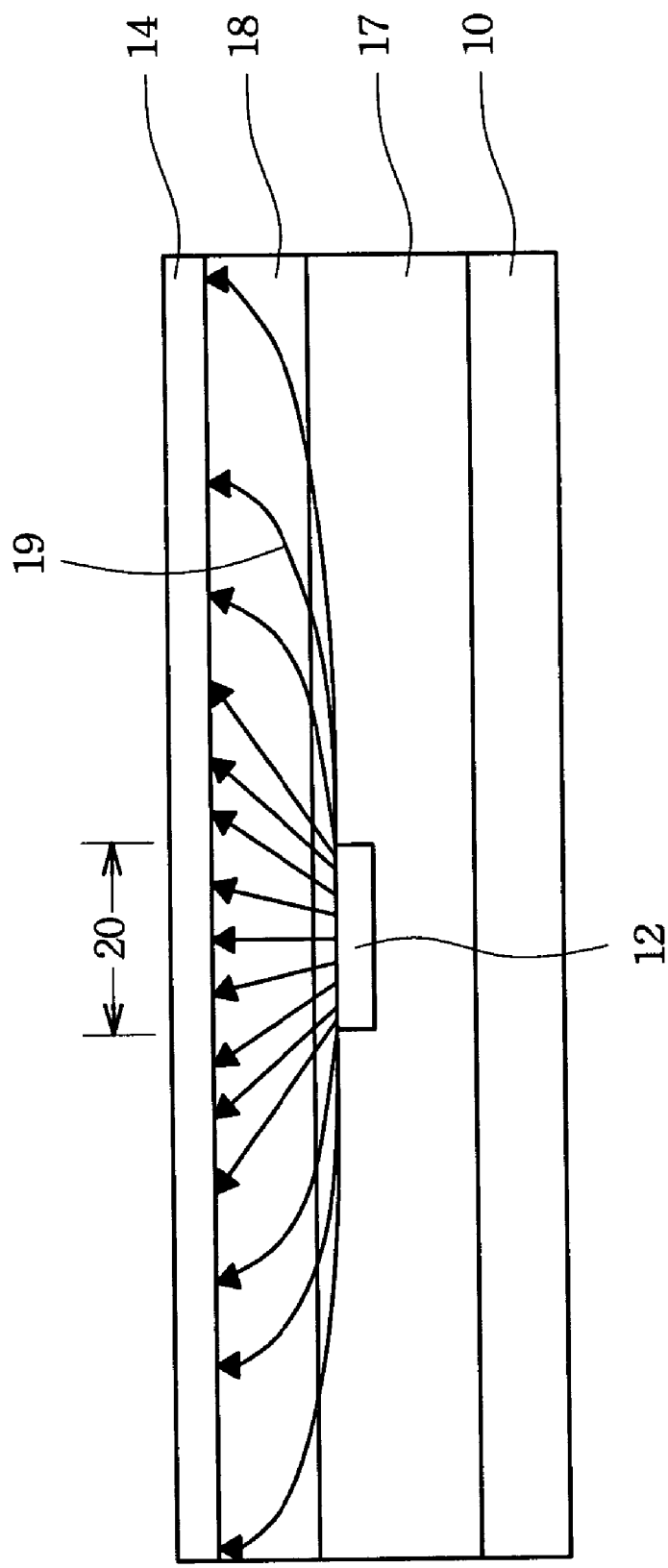
FIG. 2B is a schematic, cross-sectional view taken along 2A—2A of FIG. 1, where the electric field lines emitted from the data line are illustrated.
Figure 3:
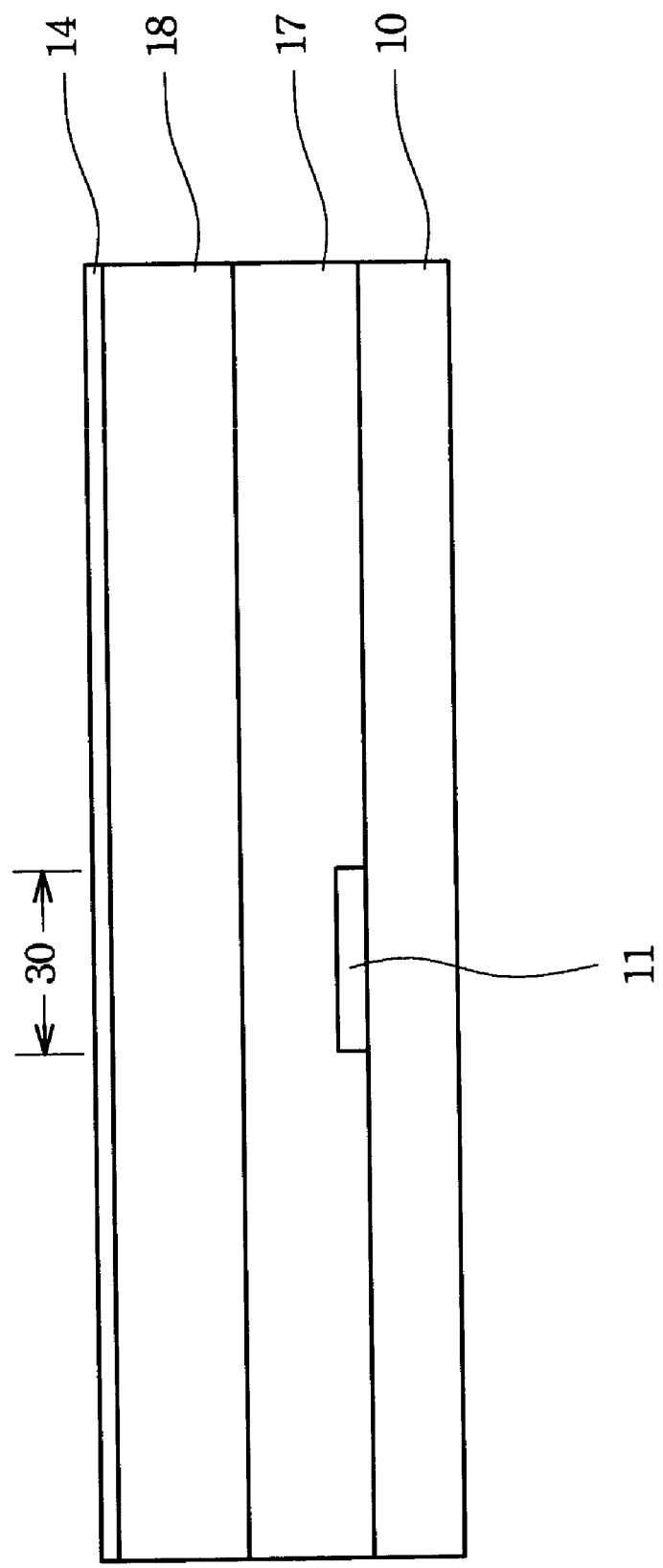
FIG. 3 is a schematic, cross-sectional view taken along 3—3 of FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 4:
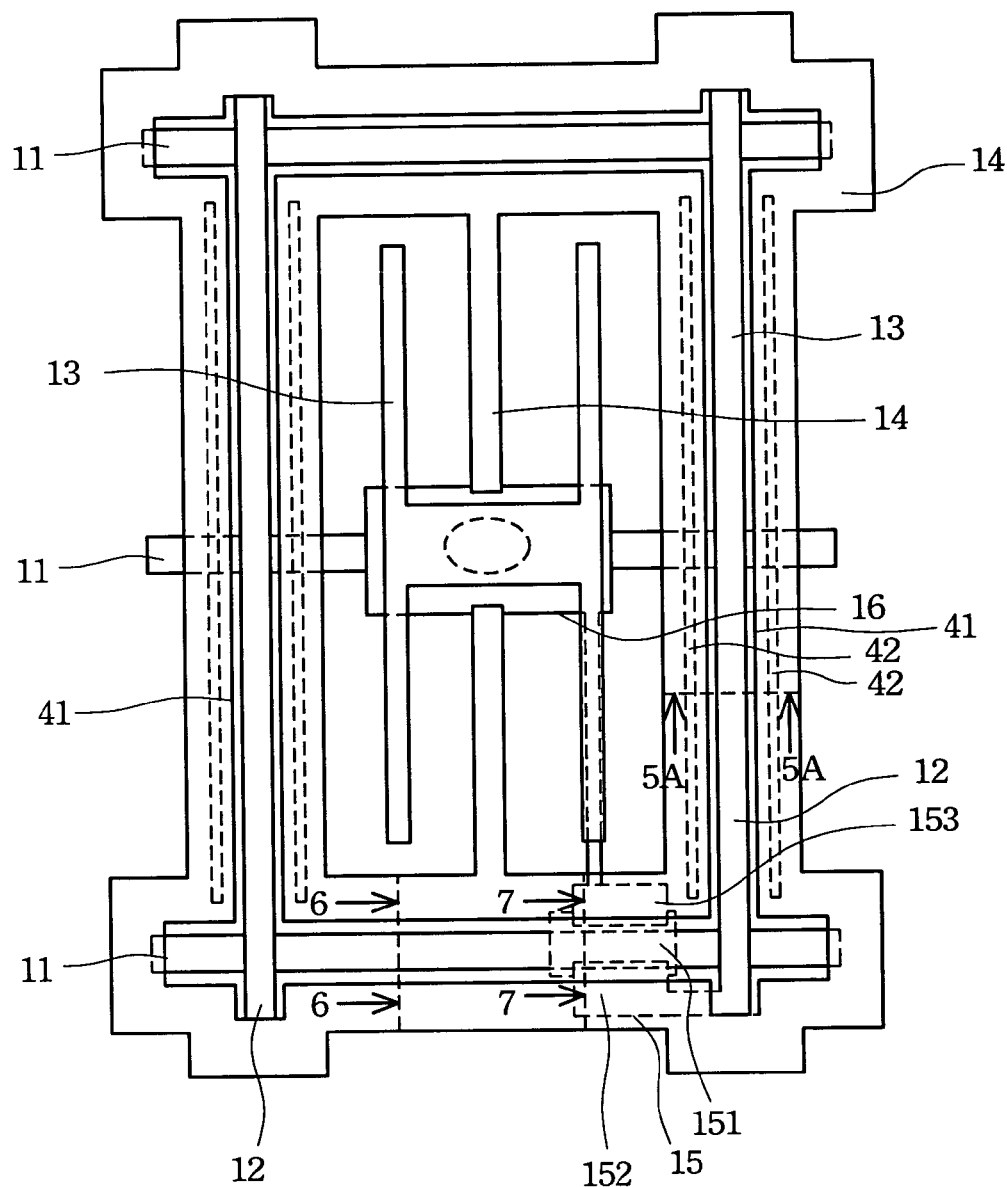
FIG. 4 is a top view of a pixel structure of an in-plane switching liquid crystal display device in accordance with the present invention.

Reference is made to FIG. 4, which is a top view of a pixel structure of an in-plane switching liquid crystal display device in accordance with the present invention. According to the present invention, an opening 41 is formed in the common electrode 14 directly over the data line 12, the gate line 11 and the transistor 15, wherein the opening 41 is wider than the data line 12. Therefore, the generated coupling capacitance between the common electrode 14 and the data line 12, the gate line 11 and the transistor 15 can be lowered. The subsequent steps to manufacture the IPS liquid crystal display device will form a black matrix directly over the common electrode 14, so there is no problem of leaking light even if the opening 41 is formed in the common electrode 14.

Figure 5A:
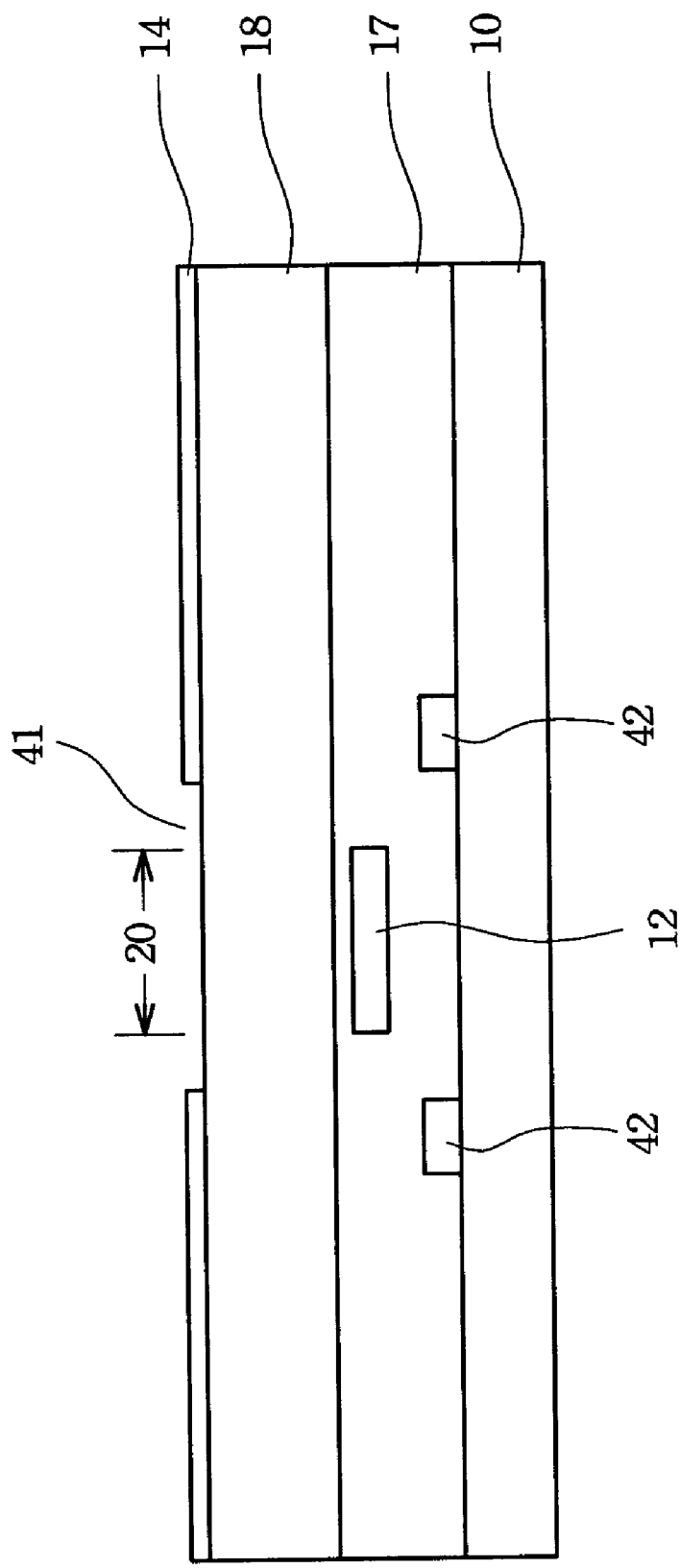
FIG. 5A is a schematic, cross-sectional view taken along 5A—5A of FIG. 4.
Figure 5B:
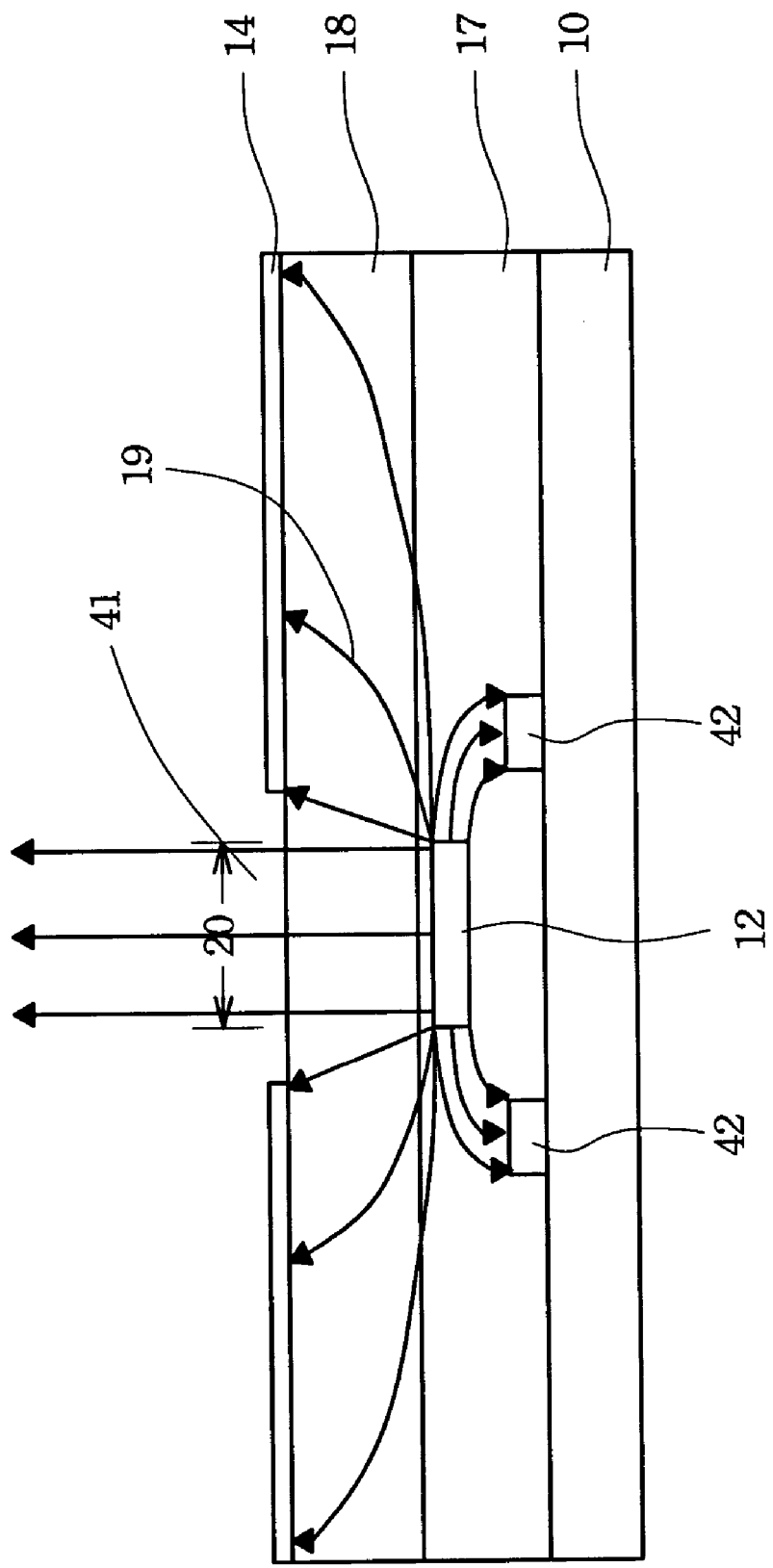
FIG. 5B is a schematic, cross-sectional view taken along 5A—5A of FIG. 4, where the electric field lines emitted from the data line are illustrated.

Reference is made to FIG. 5A, which is a schematic, cross-sectional view taken along 5A—5A of FIG. 4. The opening 41 is formed in the common electrode 14, and the opening 41 is wider than the data line 12. According to the present invention, a pair of data line fringe field shielding elements 42 can be further respectively formed at a position adjacent to a lateral side of the data line 12 and on the glass substrate 10. As shown in FIG. 5B, the electric field lines 19 pass through the opening 41 of the common electrode 14 so that a coupling capacitance between the data line 12 and the region 20 will not be generated. Preferably, the data line 12 is made of molybdenum-aluminum-molybdenum alloy, and a width of the data line 12 is ranged from 0.1 to 30 micrometers. Preferably, the data line fringe field shielding element 42 is made of aluminum-neodymium alloy or molybdenum-tungsten alloy, and a width of the data line fringe field shielding element 42 is ranged from 0.1 to 30 micrometers.

Figure 6:
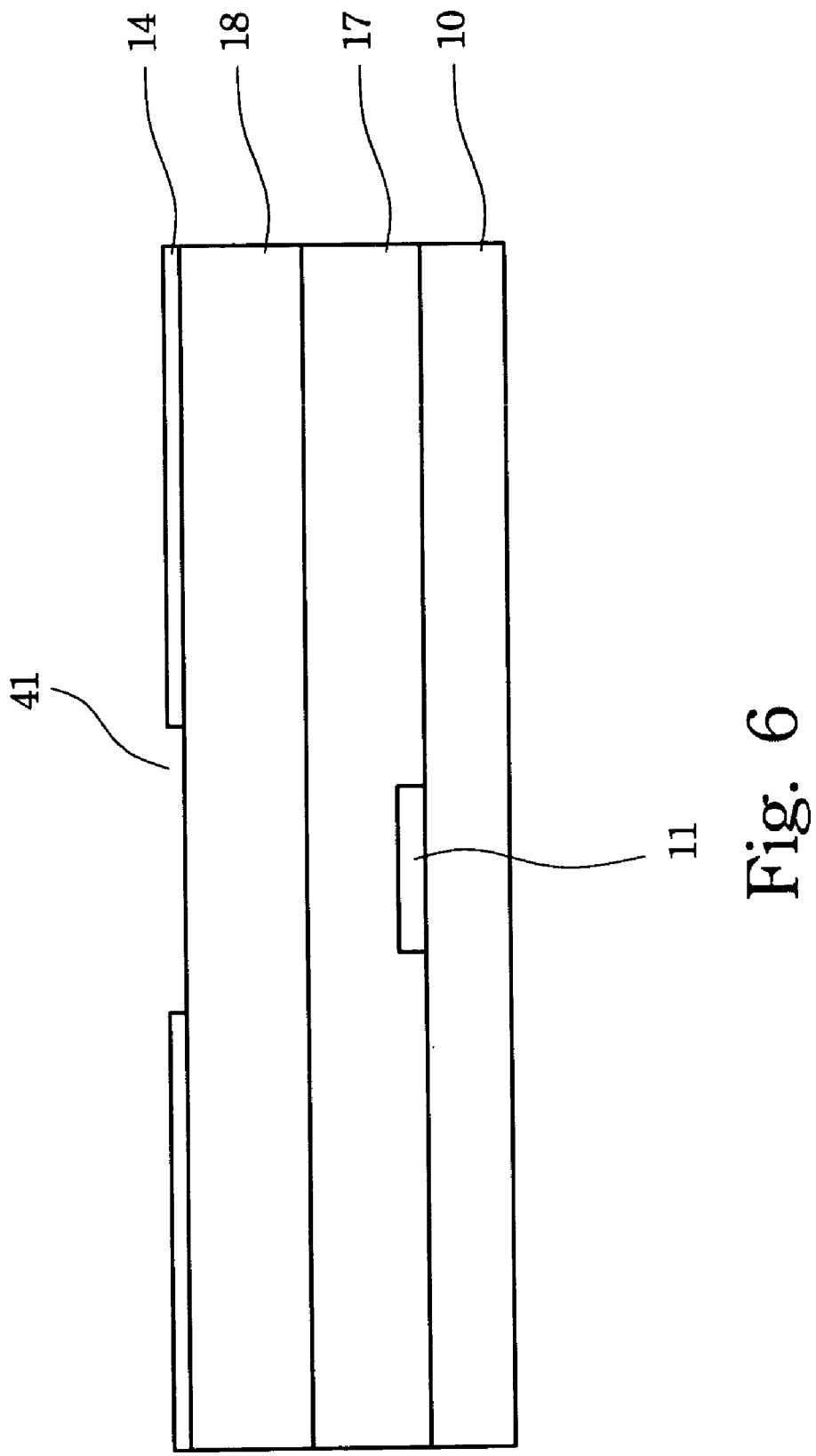
FIG. 6 is a schematic, cross-sectional view taken along 6—6 of FIG. 4.
Figure 7:
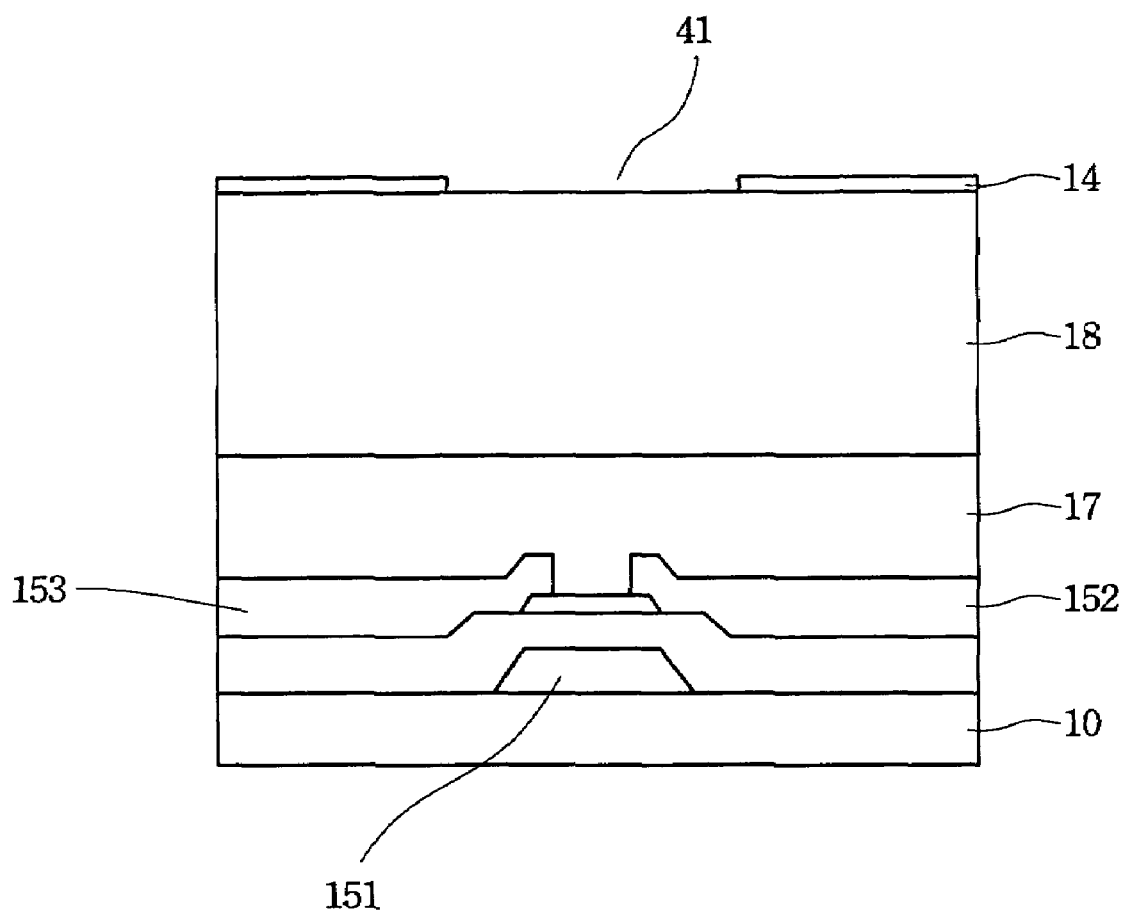
FIG. 7 is a schematic, cross-sectional view taken along 7—7 of FIG. 4.

Likewise, please refer to FIGS. 6 and 7, which respectively illustrates a schematic, cross-sectional view taken along 6—6 and 7—7 of FIG. 4. According to the present invention, the transistor is a bottom gate transistor, and an opening 41 is formed in the common electrode 14, thereby decreasing the generated coupling capacitance between the gate line 11, the transistor 15 and the common electrode 14. Preferably, the gate line 11 is made of aluminum-neodymium alloy or molybdenum-tungsten alloy, and a width of the gate line 11 is ranged from 0.1 to 50 micrometers.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure of an in-plane switching liquid crystal display device, said pixel structure comprising:
   a glass substrate;
   a data line disposed over said glass substrate;
   a common electrode disposed over said data line, said common electrode having an opening located directly over said data line, wherein said opening is wider than said data line; and
   a pair of data line fringe field shielding elements respectively disposed at a position adjacent to a lateral side of said data line and on said glass substrate.

2. The pixel structure according to claim 1, wherein said data line fringe field shielding element is made of a material selected from a group consisting of aluminum-neodymium alloy and molybdenum-tungsten alloy.

3. The pixel structure according to claim 1, wherein a width of said data line fringe field shielding element is ranged from 0.1 to 30 micrometers.

4. The pixel structure according to claim 1, wherein said pixel structure further comprises an organic layer disposed between said data line and said common electrode.

5. The pixel structure according to claim 4, wherein said organic layer is made of photocured acrylic type material.

6. The pixel structure according to claim 1, wherein said data line is made of molybdenum-aluminum-molybdenum alloy.

7. The pixel structure according to claim 1, wherein a width of said data line is ranged from 0.1 to 30 micrometers.

8. The pixel structure according to claim 1, wherein said pixel structure further comprises a black matrix disposed over said common electrode.

9. A pixel structure of an in-plane switching liquid crystal display device, said pixel structure comprising:
   a glass substrate;
   a data line disposed over said glass substrate;
   a pair of data line fringe field shielding elements respectively disposed at a position adjacent to a lateral side of said data line and on said glass substrate; and
   a common electrode disposed over said data line, said common electrode having an opening located directly over said data line, wherein said opening is wider than said data line.

10. The pixel structure according to claim 9, wherein said data line fringe field shielding element is made of a material selected from a group consisting of aluminum-neodymium alloy and molybdenum-tungsten alloy.

11. The pixel structure according to claim 9, wherein said pixel structure further comprises an organic layer disposed between said data line and said common electrode.

12. The pixel structure according to claim 11, wherein said organic layer is made of photocured acrylic type material.

13. The pixel structure according to claim 9, wherein said pixel structure further comprises a black matrix disposed over said common electrode.

14. A pixel structure of an in-plane switching liquid crystal display device, said pixel structure comprising:
   a glass substrate;
   a data line disposed over said glass substrate;
   a pair of data line fringe field shielding elements respectively disposed at a position adjacent to a lateral side of said data line and on said glass substrate; and
   a common electrode disposed over said data line, said common electrode having an opening located directly over said data line.

15. The pixel structure according to claim 14, wherein said data line fringe field shielding element is made of a material selected from a group consisting of aluminum-neodymium alloy and molybdenum-tungsten alloy.

16. The pixel structure according to claim 14, wherein a width of said data line fringe field shielding element is about 0.1 mm to about 30 mm.

17. The pixel structure according to claim 14, wherein said data line is made of molybdenum-aluminum-molybdenum alloy.

18. The pixel structure according to claim 14, further including a gate line disposed on said glass substrate, wherein:
   said gate line is made of a material selected from a group consisting of aluminum-neodymium alloy and molybdenum-tungsten alloy; and
   said common electrode is disposed over said gate line with the opening thereof located directly over said gate line.

19. The pixel structure according to claim 14, further including a transistor disposed on said glass substrate, wherein:
   said transistor is a bottom gate transistor; and
   said common electrode is disposed over said transistor with the opening thereof located directly over said transistor.

20. The pixel structure according to claim 14, further comprising an insulating layer disposed between said data line and said common electrode.

21. The pixel structure according to claim 20, wherein said insulating layer is an organic layer made of a photocured acrylic type material.

* * * * *